United States Patent
Wigh et al.

(10) Patent No.: US 6,297,453 B1
(45) Date of Patent: Oct. 2, 2001

(54) CABLE PROTECTOR

(75) Inventors: Anders Wigh; Mathias Falk; Jan Siesjö, all of Linköping (SE)

(73) Assignee: Bofors Underwater Systems AB, Linkoping (SE)

( * ) Notice: Subject to any disclaimer, the term of this patent is extended or adjusted under 35 U.S.C. 154(b) by 0 days.

(21) Appl. No.: 09/380,841

(22) PCT Filed: Mar. 5, 1998

(86) PCT No.: PCT/SE98/00391

§ 371 Date: Dec. 9, 1999

§ 102(e) Date: Dec. 9, 1999

(87) PCT Pub. No.: WO98/42053

PCT Pub. Date: Sep. 24, 1998

(30) Foreign Application Priority Data

Mar. 14, 1997 (SE) .................................... 9700919

(51) Int. Cl.[7] .................................... H02G 15/02
(52) U.S. Cl. .................. 174/74 R; 174/75 F; 174/79
(58) Field of Search .............. 174/74 R, 75 F, 174/79, 84 R, 86; 166/241.2, 241.4, 241.5, 113, 241.7

(56) References Cited

U.S. PATENT DOCUMENTS

| | | |
|---|---|---|
| 3,628,606 | * 12/1971 | Bernard ................... 166/241 |
| 3,853,082 | * 12/1974 | Rosenberg et al. ............ 114/51 |
| 3,855,102 | 12/1974 | Palmer ..................... 204/196 |
| 3,895,176 | * 7/1975 | Cookson et al. .............. 174/28 |
| 4,050,765 | * 9/1977 | Duesterhoeft et al. ....... 339/117 R |
| 4,284,249 | * 8/1981 | Lefallasi et al. ............ 242/54 R |
| 4,425,966 | * 1/1984 | Garney ..................... 166/241 |
| 4,659,253 | * 4/1987 | Jacobson .................. 405/171 |
| 5,547,020 | * 8/1996 | Sable et al. ................ 166/65.1 |
| 5,688,012 | * 11/1997 | Siesjo et al. ............. 294/82.32 |

FOREIGN PATENT DOCUMENTS

| 4028912A1 | 9/1991 | (DE) . |
| 0 205 372 A1 | 12/1986 | (EP) . |

* cited by examiner

*Primary Examiner*—Dean A. Reichard
*Assistant Examiner*—William H. Mayo, III
(74) *Attorney, Agent, or Firm*—Connolly Bove Lodge & Hutz

(57) ABSTRACT

The present invention relates to a cable protector for underwater craft remote-controlled by cable. The function of the cable protector is to protect the operating cable of the underwater craft against wearing and catching on a surface mother-ship from which the craft is operated. The cable protector guides the operating cable out to such a great depth that it runs clear of the ship. At the same time, the cable protector allows the cable to run out in any chosen direction, while limiting a deflection angle at which the operating cable leaves the cable protector. The cable protector includes telescopically acting helical springs and a link system at a lower portion which prevents the operating cable from bending too tightly while it ensures that the cable runs out in the direction of the underwater craft.

6 Claims, 4 Drawing Sheets

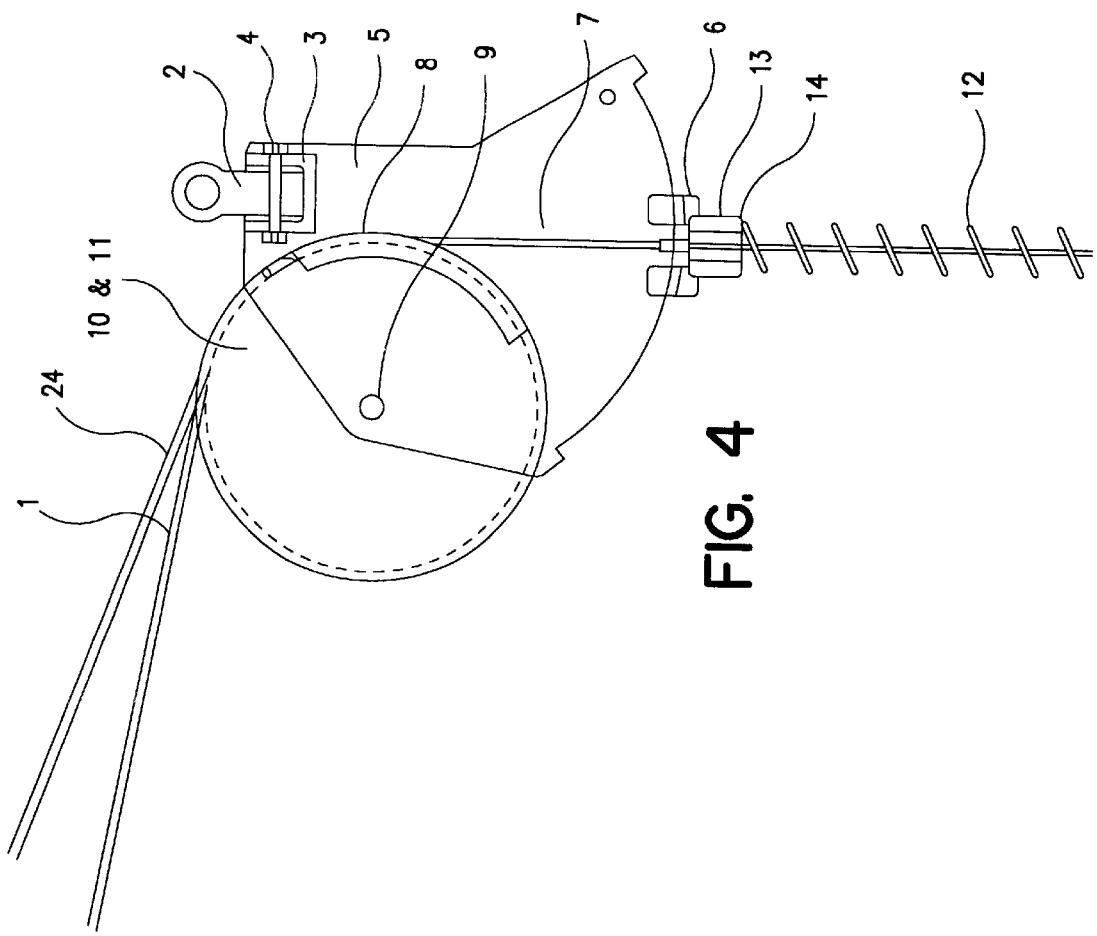
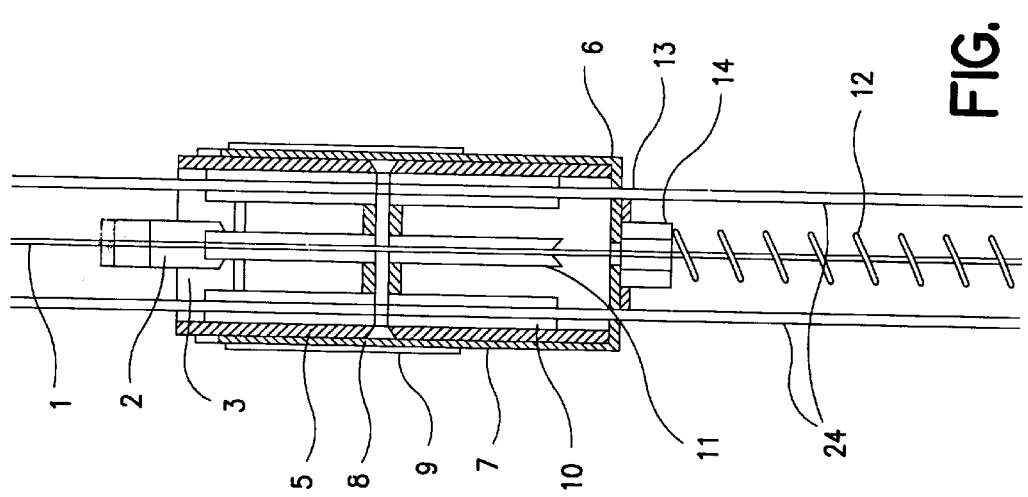

CABLE PROTECTOR

BACKGROUND OF THE INVENTION

1. Field of the Invention

The present invention relates to a cable protector intended to protect the operating cable for a remote-controlled underwater craft from wear or getting caught on any part of the surface mother-ship from which operations with craft are being carried out.

2. Description of the Related Art

Unmanned cable-controlled underwater craft of the type concerned here have in recent years, had a very broad range of application insofar as they can be provided with both television cameras for seabed and wreck exploration, and manipulators for carrying out even highly complicated work guided by what the cameras see. Insofar as these craft as a rule operate from a surface mother-ship, it is in most cases the conditions on the surface of the water which are decisive with regard to whether work can be carried out or not.

For example, it is not possible to operate under conditions in which there is a risk of the operating cable being damaged in such a way that the underwater craft could be lost. In heavy seas and when the mother-ship has to travel at a certain speed through the water at the same time as the underwater craft has to move over large areas, e.g. during hunting for wrecks or mines or during seabed exploration, there is a great risk of the operating cable of the underwater craft being damaged by wearing against or by getting caught on the surface mother-ship.

An object of the present invention is to provide a cable protector for such cable-controlled underwater craft, which prevents wearing against and catching on the surface mother-ship both in high seas and when the ship travels at a certain speed through the water. The cable protector should also always allow the operating cable to run out in the direction of the craft at the same time as it prevents, in this connection, the operating cable being bent in too tight a curve which could lead to damage to the same.

The cable protector according to the invention is designed in such a manner that it guides the operating cable out of its protective cover at such a great depth that the cable runs completely clear of the surface mother-ship in all directions, even when the ship and/or the craft travels at a certain speed through the water. In order to be capable of performing this function, the cable protector must thus have a not inconsiderable length. At the same time it must be capable of being taken aboard the surface mother-ship without major problems, and it must not in itself cause water resistance which is so great that problems consequently arise as far as operation of the underwater craft is concerned.

It has now been possible to take all these requirements, which are individually important and in some cases difficult to combine, into consideration and the result is the cable protector as described hereinafter.

BRIEF SUMMARY OF THE INVENTION

The basic idea of the invention is that the operating cable of the underwater craft, from the point at which it runs out over the rail of the surface mother-ship and down to an adequate depth below the surface of the water, so as to eliminate completely any risk of abrasion or catching with regard to the mother-ship, is to be protected by a tension spring which surrounds the cable. The tension spring is depth-regulated by extension to the desired length and is helically wound into a preferably circular cross-section. By virtue of its open construction in the extended state, such a protective spring causes minimal resistance in the water at the same time as it affords the operating cable running through its hollow center lateral protection on all sides. The invention also provides that the length of extension of this protective tension spring is in each case adjustable by means of wires which run parallel to the spring. The wires can be fed out to the desired length while a ballast arranged at the free outer end of the tension spring, where the wires also are fastened, ensures that the tension spring always has the maximum extension defined by the wires.

The invention also includes a specially designed link system which is arranged in the lower part of the cable protector and allows the operating cable to run out in any chosen direction. At the same time, the link system prevents the cable being bent so that it has far too small a radius which would otherwise have involved the risk of serious damage to the operating cable. The possibility for the operating cable to run out in any chosen direction from the cable protector, depending on the relative position of the underwater craft in relation to the surface mother-ship, also means that the risk of the operating cable becoming entangled in itself or, as it were, tying itself in knots has been eliminated completely.

So as to make it possible to combine a great maximum length of extension of the tension spring part of the cable protector with the shortest possible length in the contracted state, it is further proposed according to a preferred variant of the invention that the tension spring part may consist of two or more tension spring parts which are telescopically displaceable relative to one another, arranged one inside another and helically wound in opposite directions to one another.

BRIEF DESCRIPTION OF THE SEVERAL VIEWS OF THE DRAWING

A preferred but non-limiting embodiment of the invention is described in greater detail in conjunction with FIGS. 1–8, in which

FIGS. 3 and 4 show on a larger scale a section seen from the front and a side view of the upper parts of the cable protector.

DETAILED DESCRIPTION OF THE INVENTION

Figures 1, 2:
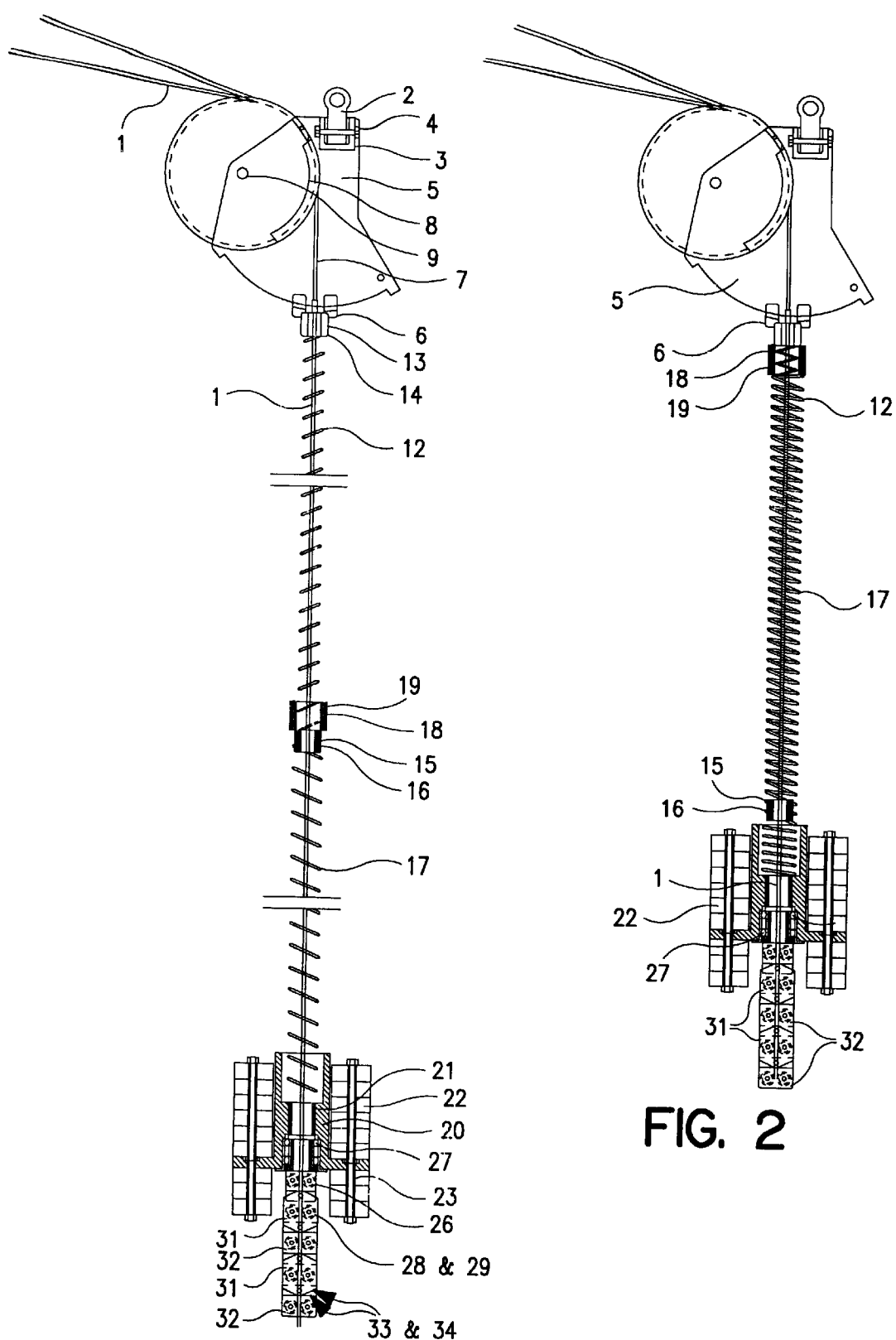
FIGS. 1 and 2 show in partial section a side view and front view, respectively, of the cable protector according to the invention in the extended and retracted position respectively.
Figure 5:
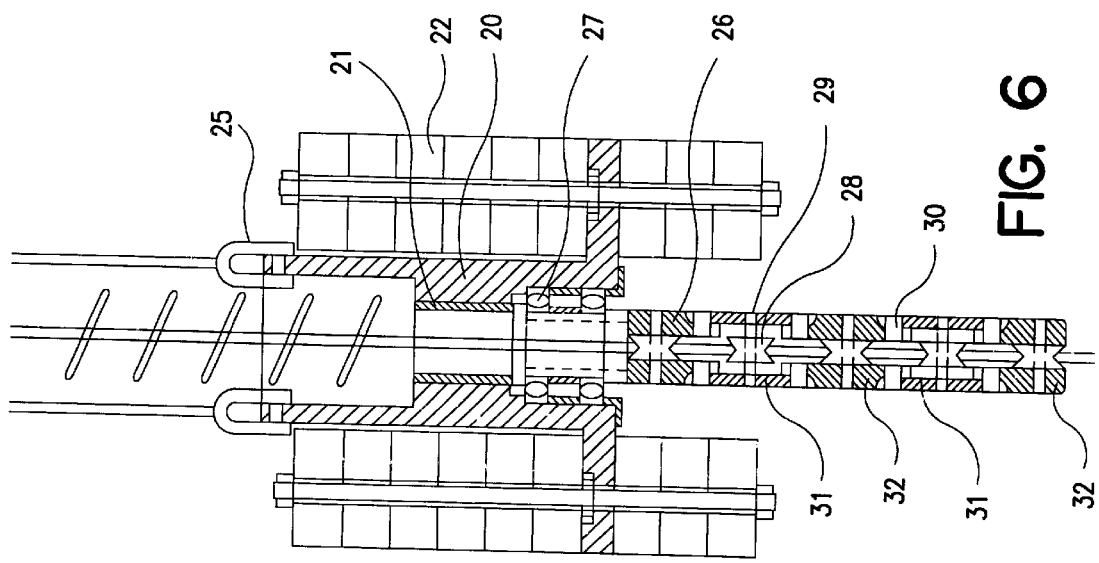
FIGS. 5 and 6 show on the same scale as FIGS. 3 and 4 a section seen from the side and a section seen from the front respectively of the lower parts of the cable protector.
Figure 6:
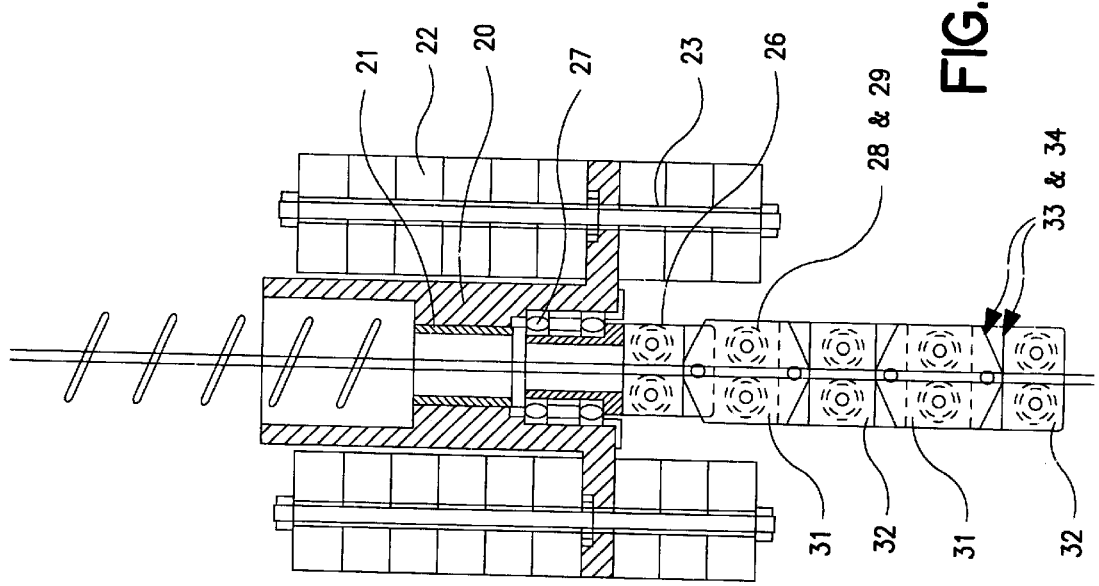

The cable protector according to the invention can broadly be described in a few words as a proboscis of variable length. It is intended to be suspended vertically in a movable joint 2 in a jib or the like outside the rail of the surface mother-ship.

The joint 2 is mounted in a channel beam 3 by a screw 4 about which the joint is movable. Located on the ends of the channel beam are side plates 5, against the lower edge sides of which the fixing plate 6 is fixed by two wires 7 which run along the outside of the side plates. The wires each run in their own guide track 8 which is mounted on the respective side plate. Mounted on the same spindle 9 between the side plates are three pulleys. The outer pulleys 10 are wire pulleys and the pulley in the middle 11 is a cable pulley.

The proboscis itself consists of a first part comprising two helical springs 12 and 17, respectively, of the tension spring type, which are displaceable one inside the other and wound in opposite directions to one another. The helical spring part of the proboscis is intended to hang down essentially vertically in the water, but it has a certain capacity for movement in the water at the same time, because its open construction minimizes water resistance when the cable protector moves through the water.

Figure 8:
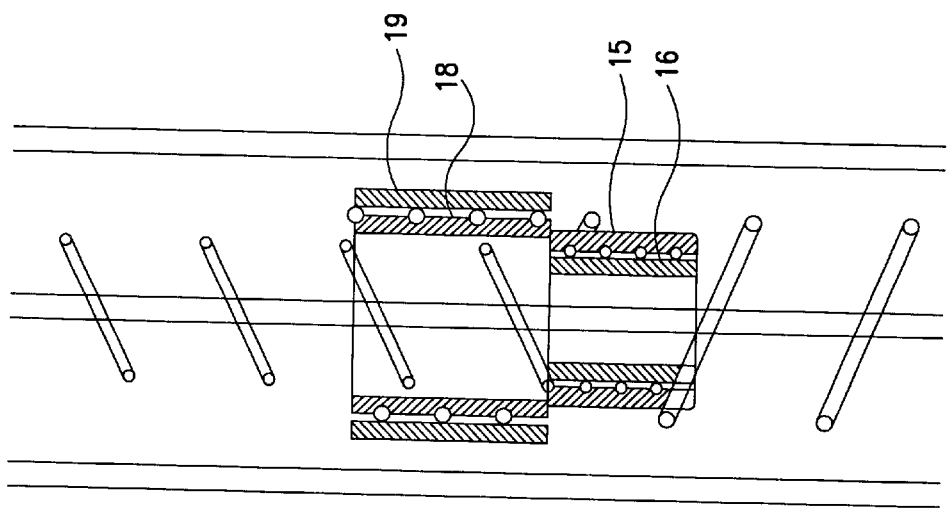
FIG. 8 shows on, larger scale, finally, how the spring sleeves at the ends of the tension spring parts interact and prevent the tension springs running one out of another completely.

In the example shown, there are two helical springs, 12 and 17 respectively. These are prevented from sliding one out of the other completely by the sleeves shown in FIG. 8. The same technique has been used for fixing the springs in the upper and lower parts, respectively of the cable protector.

At the upper end of the inner helical spring 12, the sleeve 13 is thus screwed onto the spring. The sleeve has an internal thread with the same thread profile as the spring wire and the same pitch as the spring has at 80–90% of maximum tensile load.

The sleeve 13 is then screwed firmly into a fixing plate 6. The inner sleeve 14, pressed inside the spring, prevents the spring from creeping out of the sleeve 13. Located at the lower end of the spring is a sleeve with an internal thread 15 screwed on the outside of the spring. Located inside the spring, facing the outer sleeve 15, is a clamping sleeve 16 which is to prevent the spring from creeping out of the thread of the inner sleeve (see FIG. 8).

Located at the upper end of the outer helical spring 17 is a corresponding sleeve 13 with an external thread screwed into the spring. An outer sleeve 19 is then pressed on, on the outside of the spring, so as to prevent the spring from coming loose from the inner sleeve 18. At its lower end, the outer spring is screwed into a tube 20. A locking sleeve 21 is pressed into the inside of the spring. A number of lead weights 22 are screwed firmly on the tube 20 by means of four threaded rods 23.

The length of the spring part fed out is determined in each individual case by two lifting wires 24 arranged immediately outside and parallel to the helical springs. The lead weights 22 insure at the same time that, as far as possible, the helical spring parts hang down vertically in the water.

The lifting wires 24 come from a winch or the like and run parallel around the wire pulleys 10 and on through their individual holes in the fixing plate 6 and down to the tube 20 where they are attached by shackles 25.

Figure 7:
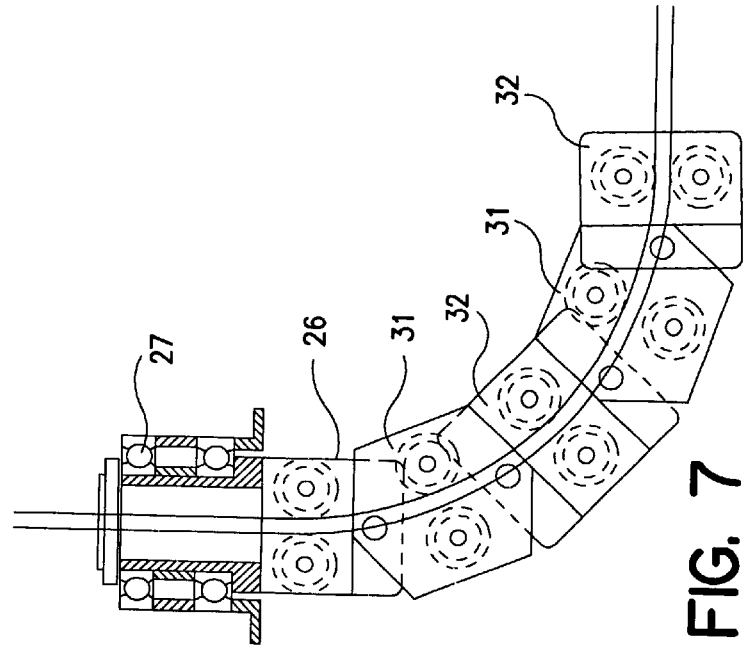
FIG. 7 shows on a larger scale how the link system at the end of the cable protector limits the deflection angle of the cable running out.

The cable protector ends at the bottom in a link system which limits the deflection angle at which the operating cable 1 for the underwater craft (not shown in the figures) leaves the cable protector. This link system is mounted rotatably about the point of exit of the operating cable from the tube 20 to which the lead weights 22 are fixed. The link system is thus, via double ball-bearings 27, freely rotatable about the direction of exit of the operating cable 1. The link system consists of two types of links, 31 and 32, respectively, which are arranged alternately one after another. Each contain two guide rollers 28 each mounted on its own spindle 29. The operating cable 1 itself runs forward guided between the pairs of guide rollers 28 of the links. The links 31 and 32, respectively, are also laterally movable relative to one another about spindles 30 which are parallel to the spindles 29 of the guide rollers 28. The lateral mobility of the links 31, 32 relative to one another is limited by mutually interacting contact surfaces formed on the respective links. In this way, limiting of the maximum lateral direction of the operating cable shown in FIG. 7 is achieved, which allows a maximum lateral direction of the operating cable of 90°, but at the same time limits the deflection angle of the operating cable. That is, it ensures that the radius of curvature of the cable does not become too tight. At the same time, the lateral direction of the operating cable can move freely about the abovementioned ball-bearings 27.

Operation

The function of the cable protector is thus to protect the cable for the craft from wearing or catching on any part of the ship.

The construction is provided with and kept down by the lead weights 22. It will therefore be possible for the cable to run out towards the craft at such a depth that the cable runs clear of the ship in all directions. The cable protector is constructed so as to be usable even when the ship and/or the craft is travelling at a certain speed through the water. It is also able to handle the tensile force which exists in the cable during normal operation.

In order to facilitate handling of the cable protector, its length can be varied continuously from roughly 2 meters when it is not in use, to roughly 12 meters in operation.

The entire cable protector is suspended in the joint 2 in a crane or the like outside the rail of the mother-ship. The cable 1 for the craft comes from a cable winch and runs via the cable pulley 11 down through a hole in the fixing plate 6 into the inner helical spring 12, and on through the outer helical spring 17. Finally, the cable passes through the tube 20 and out between the rollers 28 in the link system.

The suspension of the fixing plate 6 is designed so that the upper helical spring 12 is always directed at a tangent to the cable pulley in order that the cable will not wear against the fixing plate and the entrance to the spring. This function is achieved by the fixing plate 6 being suspended in wires 7 which in turn each run in their own guide track 8 with the same radius and center as the cable pulley 11 and the winch pulleys 10.

The fixing plate is also provided with guide lugs on the outer sides which run against the lower edges of the side plates 5, which edges are shaped like the curve which the fixing plate describes when it moves. When the cable protector is not in use, the length of the construction as a whole, which during operation may thus be up to 12 meters, can be reduced to just 2 meters. This is possible as a result of the use of helical springs of the tension spring type, i.e. springs which tend towards contraction with the spring turns tightly wound. Moreover, use is made of two or more helical springs of different diameter which act telescopically. The length is varied by winching the tube 20 up or down by the lifting wires 24. In the fully retracted position, the inner spring is located inside the cuter.

Extension of the cable protector is brought about by the lifting wires being winched out and the tube being lowered. The outer spring 17 will run downwards on the outside of the inner spring 12 until the upper, inner sleeve 18 of the outer spring comes into contact with the lower, outer sleeve 15 of the inner spring (see FIG. 8). Then the helical springs begin to extend. The weight of the tube 20 plus the lead weights 22 etc. is so great that the helical springs are extended at the same rate as the lifting wires are winched out.

The link system arranged at the lower end of the cable protector and provided with guide rollers has the function of ensuring that the cable is not bent with too small a radius and that the cable is directed towards the craft at the exit from the cable protector. The top link pair 26 is mounted in the tube 20 which means that the entire link system can rotate and the tensile force in the cable means that the exit of the link system points towards the craft. The link system consists of outer links 31 and inner links 32 which are joined together by a pin 30. Mounted on the spindles 29 between each link pair are two guide rollers 28, and the cable runs between the rollers. The rotation of the outer links and the inner links about one another is limited by the edges 33 and 34 coming up against one another.

FIG. 7 shows the link system in straight position and at maximum bending respectively.

What is claimed is:

1. A cable protector for a cable connected to a remote-controlled underwater craft operated from a surface mother-ship, comprising:

a protective helically wound tension spring part surrounding said cable, said tension spring part being extendable in an extension direction to a depth such that the cable runs clear of said mother-ship even when said mother-ship travels at a certain speed through water;

a weight load acting on said cable in said extension direction;

lifting wires parallel to said tension spring part, for limiting said cable in said extension direction, said wires being capable of being winched out and in; and a link system at a free end of said protector for preventing said cable from being bent with too small a radius and for allowing said cable to run out of said protector in a direction of said craft.

2. The cable protector of claim 1, wherein said helically wound tension spring part comprises:

at least two tension springs arranged one inside the other, wound in opposite directions, and longitudinally displaceable relative to one another;

wherein each of said at least two tension springs is provided with a fixed end member for preventing said at least two tension springs from running one out of the other completely.

3. The cable protector of claim 1, wherein a lower end of said protector comprises fixing members for said weight load; and wherein said link system is mounted to be freely rotatable about an exit opening for passage of said cable, for limiting a deflection curve of said cable.

4. The cable protector of claim 1, wherein said link system comprises inner and outer links, wherein each of said inner and outer links comprises at least two guide rollers opposite one another, between which said cable runs, and each of said inner and outer links being movable in a lateral direction about link spindles mounted in an immediately preceding link;

wherein said link spindles are substantially parallel to spindles of said guide rollers; and a mobility of said inner and outer links relative to each other is limited such that a maximum mobility of all said inner and outer links together in a possible lateral direction does not impart to the cable a smaller bending curve that can be accepted.

5. The cable protector of claim 4, wherein a mutual lateral rotation of said inner and outer links relative to one another is limited by stop edges of said links.

6. The cable protector of claim 1, wherein a suspension joint of said surface mother-ship enables said cable to be freely movable so as to hang vertically irrespective of the movements of the surface mother-ship when at sea.

* * * * *